(12) United States Patent
Scott et al.

(10) Patent No.: US 11,427,040 B2
(45) Date of Patent: *Aug. 30, 2022

(54) APPARATUS, SYSTEMS AND METHODS FOR TIRE MOUNTING AND INFLATION

(71) Applicant: Performance Ag, LLC, Odebolt, IA (US)

(72) Inventors: John Scott, Odebolt, IA (US); Rick Sackett, Schaller, IA (US)

(73) Assignee: 5 POINT FABRICATION, LLC, Green Bay, WI (US)

( * ) Notice: Subject to any disclaimer, the term of this patent is extended or adjusted under 35 U.S.C. 154(b) by 154 days.

This patent is subject to a terminal disclaimer.

(21) Appl. No.: 16/571,772

(22) Filed: Sep. 16, 2019

(65) Prior Publication Data
US 2020/0009928 A1 Jan. 9, 2020

Related U.S. Application Data

(63) Continuation of application No. 15/234,705, filed on Aug. 11, 2016, now Pat. No. 10,414,219.

(60) Provisional application No. 62/203,768, filed on Aug. 11, 2015.

(51) Int. Cl.
*B60C 25/00* (2006.01)

(52) U.S. Cl.
CPC ........... *B60C 25/002* (2013.01); *B60C 25/16* (2013.01)

(58) Field of Classification Search
CPC ............................ B60B 24/002; B60B 25/16
USPC ..................................................... 157/16, 20
See application file for complete search history.

(56) References Cited

U.S. PATENT DOCUMENTS

| | | | | |
|---|---|---|---|---|
| 2,989,098 A | * | 6/1961 | Marshall | B60B 30/04 157/17 |
| 3,683,981 A | * | 8/1972 | Branick | G01M 17/021 157/16 |
| 5,232,035 A | * | 8/1993 | Adams, Jr. | B25H 1/0021 157/1.17 |
| 5,878,801 A | | 3/1999 | Ellis | |
| 5,992,227 A | | 11/1999 | Jellison et al. | |
| 6,681,621 B1 | | 1/2004 | Kluhsman | |
| 7,284,586 B2 | * | 10/2007 | Howland | B60C 25/01 157/14 |
| 9,597,926 B1 | | 3/2017 | Hed et al. | |

* cited by examiner

*Primary Examiner* — Hadi Shakeri
(74) *Attorney, Agent, or Firm* — von Briesen & Roper, s.c.

(57) ABSTRACT

Disclosed herein are various embodiments relating to devices, systems and methods relating to the mounting and inflating of tires for use in automotive applications. There is a need in the art for improved devices, systems and methods for tire mounting and inflation, so as to allow a user to prepare racing tires without mounting on a rim.

19 Claims, 13 Drawing Sheets

APPARATUS, SYSTEMS AND METHODS FOR TIRE MOUNTING AND INFLATION

CROSS-REFERENCE TO RELATED APPLICATION(S)

This application is a continuation of U.S. application Ser. No. 15/234,705, filed Aug. 11, 2016, and entitled "Apparatus, Systems, and Methods for Tire Mounting and Inflation," which claimed priority from U.S. Provisional Application 62/203,768, filed Aug. 11, 2015, and entitled "Devices, Systems and Methods for Tire Inflation," both of which are hereby incorporated by reference in their entirety under 35 U.S.C. § 119(e).

FIELD OF THE INVENTION

Disclosed herein are various embodiments relating to devices, systems and methods relating to the mounting and inflating of tires for use in automotive applications.

BACKGROUND OF THE INVENTION

Known tire mounts used for fixing tires are typically configured to receive solely tires that are already mounted on a rim. There is a need in the art for improved devices, systems and methods for tire mounting and inflation, so as to allow a user to prepare tires—such as racing tires—without mounting them on a rim.

BRIEF SUMMARY OF THE INVENTION

The various implementations disclosed herein relate to the mounting of tires on a tire mount without the need for a rim. This provides certain advantages in terms of the ability to quickly identify flaws in the tire, as would be understood by one of skill in the art.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the disclosure. Accordingly, the drawings and detailed description are to be regarded as illustrative in nature and not restrictive.

DETAILED DESCRIPTION

Figure 1A:
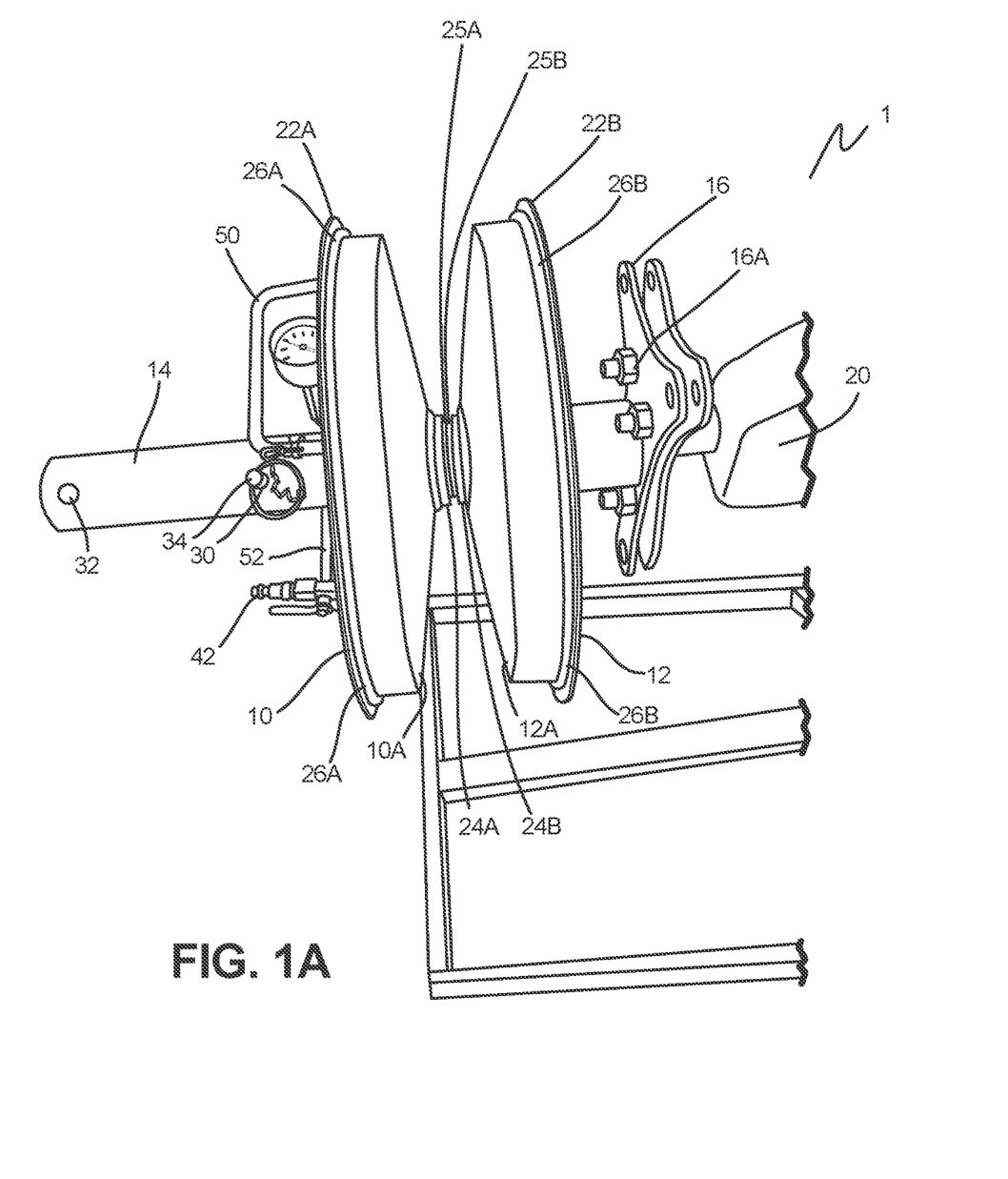
FIG. 1A is a side perspective view of the tire mount, according to one implementation.
Figure 1B:
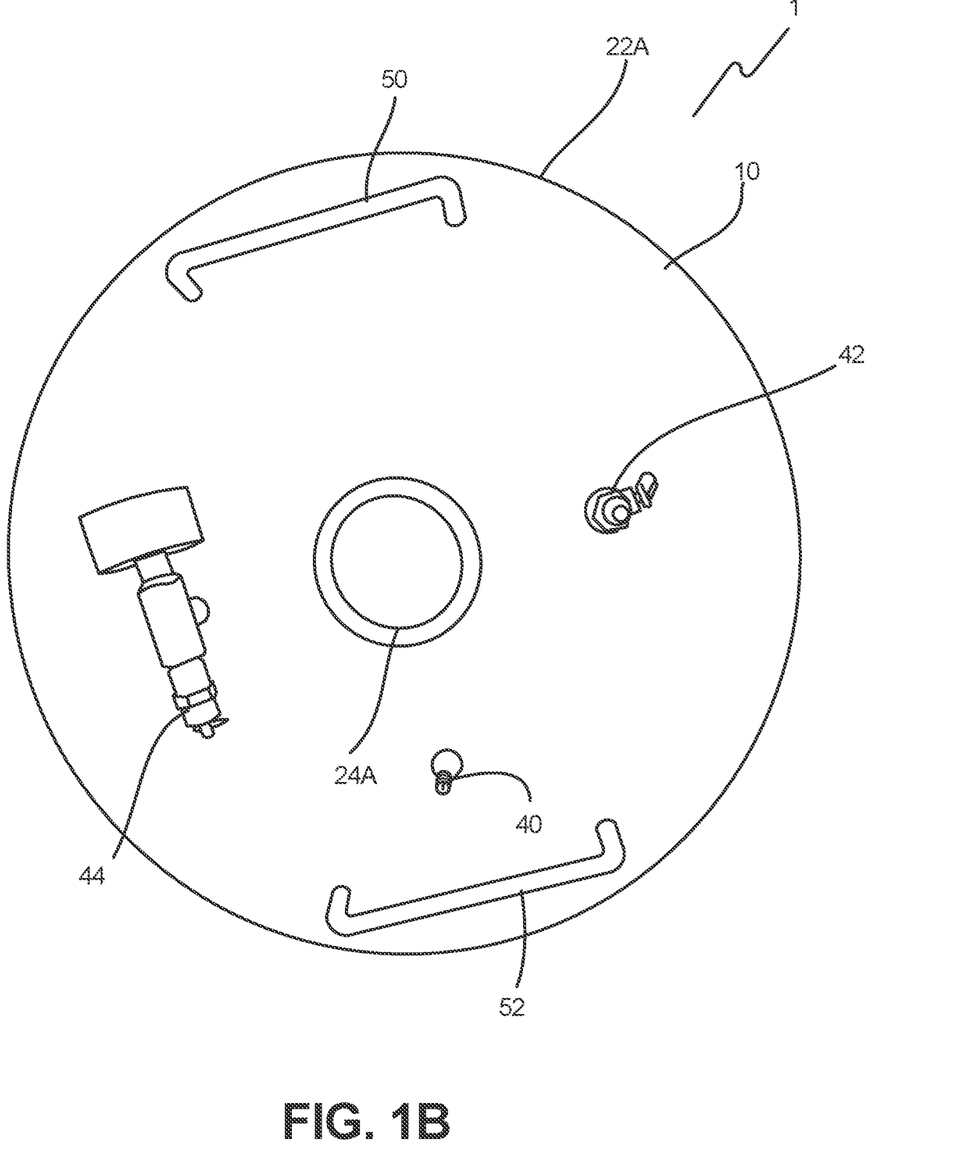
FIG. 1B is a front view of the outer plate, according to one implementation.
Figure 1C:
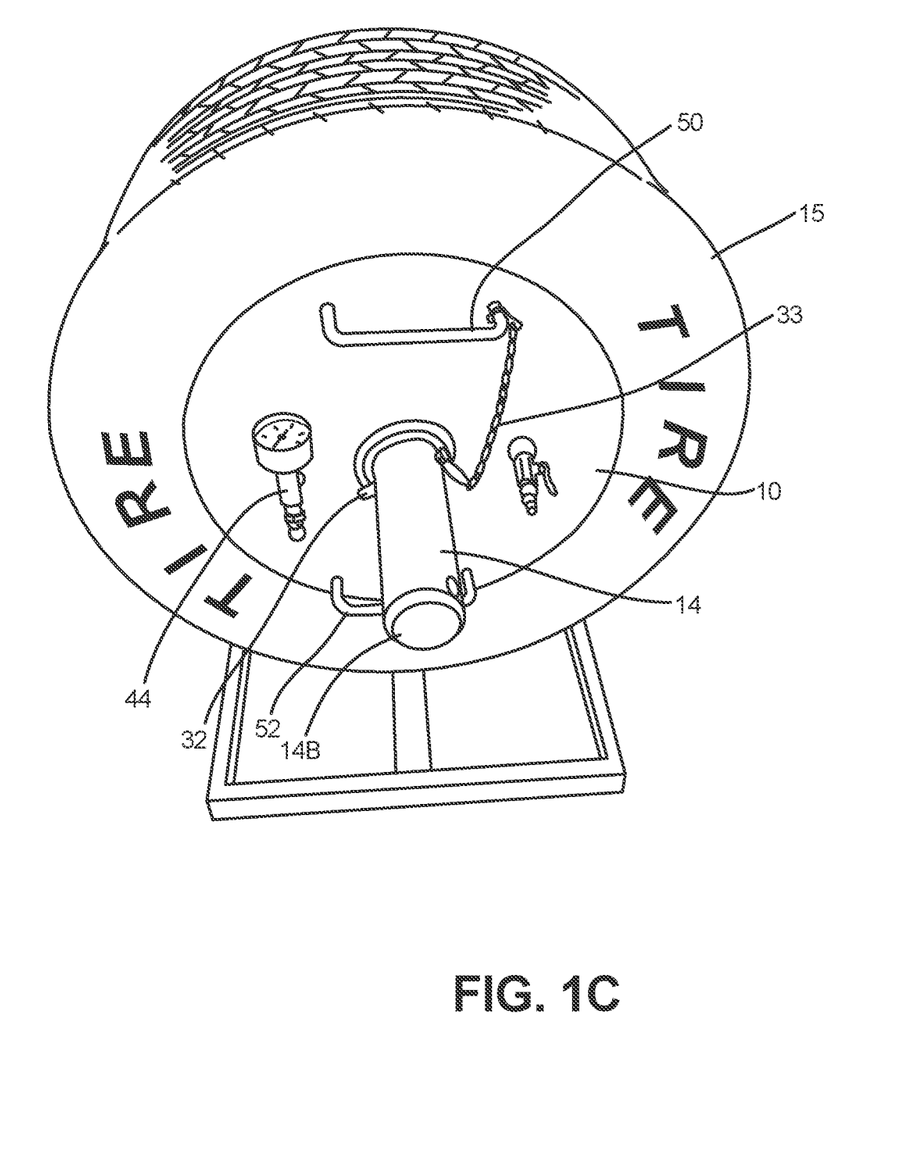
FIG. 1C is a perspective front view of the tire mount with a tire disposed between the plates, according to one implementation.

As described herein, the invention will be referred to as a split rim or tire mount 1. Certain embodiments of the disclosed tire mount 1 relate to an apparatus and system for quickly mounting a tire for repair. According to certain embodiments, and as best shown in FIG. 1A and FIG. 1B, the tire mount 1 has an outer plate 10 having an outer plate face 10A, an inner plate 12 having an inner plate face 12A, and a central axle 14. As shown in the implementation of FIG. 1C, the plates 10, 12 can be disposed along the central axle 14 to accommodate a variety of sizes of tire 15 between the outer plate face 10A and inner plate face 12A for testing and repair. In certain implementations, and as shown in FIGS. 2A-3B, the inner plate 12 is fixedly attached to the central axle 14.

In various implementations as best shown in FIGS. 1A-C, the inner plate 12 and central axle 14 are disposed on a mounting plate 16 that can be fitted to an existing prep stand 20 so as to dispose and suspend the central axle 14 out and away from the inner plate 12. In certain implementations the mounting plate 16 has a mounting pattern 16A, so as to accept "5 on 5" or "wide 5" prep stand 20 mounting configurations, as would be apparent to one of skill in the art. In these implementations, the tire mount 1 can thereby be mounted to a standard prep stand 20 used for rim mounting.

Returning to the implementation of FIG. 1A, the outer plate 10 and inner plate 12 can each have a lip or bead 22A, 22B which is configured to accept a tire, and a central opening 24A, 24B configured to receive the axle 14. In these embodiments, the central opening 24A, 24B are configured to hold O-rings 25A, 25B to form an air-tight, or hermetic seal around the outer plate 10, inner plate 12 and tire 15 when the tire is mounted on the tire mount 1. Similarly, O-rings 26A, 26B can be disposed adjacent to the beads 22A, 22B so as to allow for the creation of an air-tight seal around a mounted tire 15.

As also shown in FIG. 1A, various embodiments further comprise at least one pin 34, which can be used to limit the outward movement of the outer plate 10 by being passed through one of several holes 30, 32 defined in the central axle 14. In exemplary embodiments, these holes 30, 32 may be defined in the axle 14 at lengths of, for example, 8 inches and 14 inches from the inner plate 12, so as to accommodate frequently-used tire sizes, as would be appreciated by those of skill in the art.

As best shown in FIG. 1B, in exemplary embodiments the outer plate 10 further comprises a filling port 40 which is in selective hermetic communication with the interior of a tire when the tire is mounted so as to allow the user to fill the tire using a standard air compressor (not shown). Further, in exemplary embodiments, a pop-off safety valve 42 and tire pressure gauge 44 are provided as additional safety measures and to assist the user in filling the mounted tire to the correct inflation. In various implementations, the pop-off safety valve 42 allows for the quick release of excess pressure, and the tire pressure gauge 44 allows the user to monitor the internal pressure generated by the tire.

As is further shown in FIG. 1B, in exemplary embodiments the outer plate 10 can further comprise at least one handle 50, 52, so as to allow the easy movement of the outer plate relative to the central axle 14, for mounting and dismounting of the tire 15.

As is shown in the implementation of FIG. 1C, in certain implementations the pin 34 can be attached to one of the handles 50, 52 during use, for example by way of a retention chain 33. In these implementations, a tire 15 may be mounted (and dismounted) on the tire mount 1 so as to be connected to the outer plate 10 and inner plate 12 without the use of additional tools. In use, mounting occurs by removing the outer plate 10 and positioning the tire to be mounted between the inner 12 and outer plates 10, as shown in FIG. 3A.

Figure 2A:
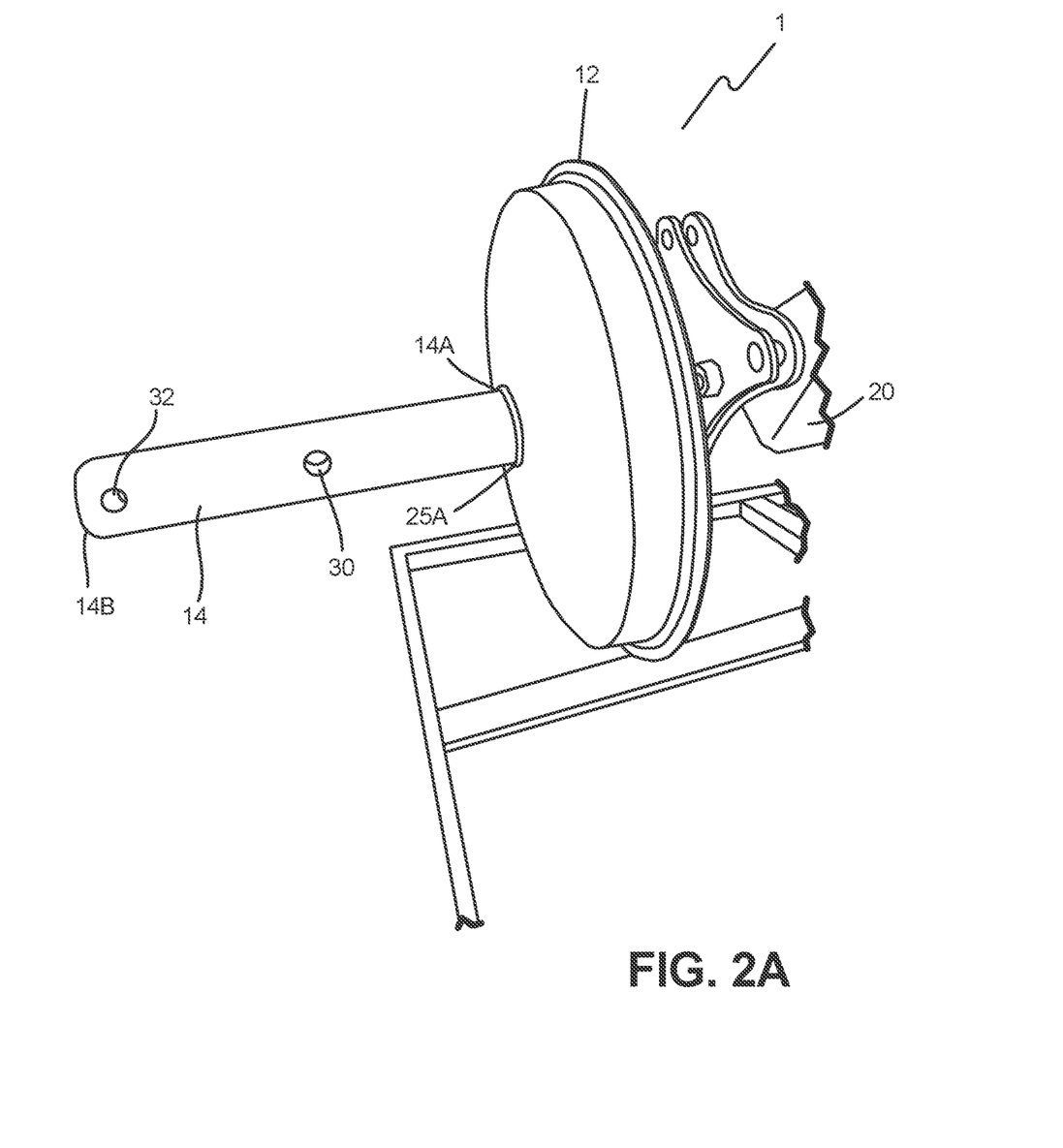
FIG. 2A is a side perspective view of the tire mount with the outer plate removed, according to one implementation.
Figure 2B:
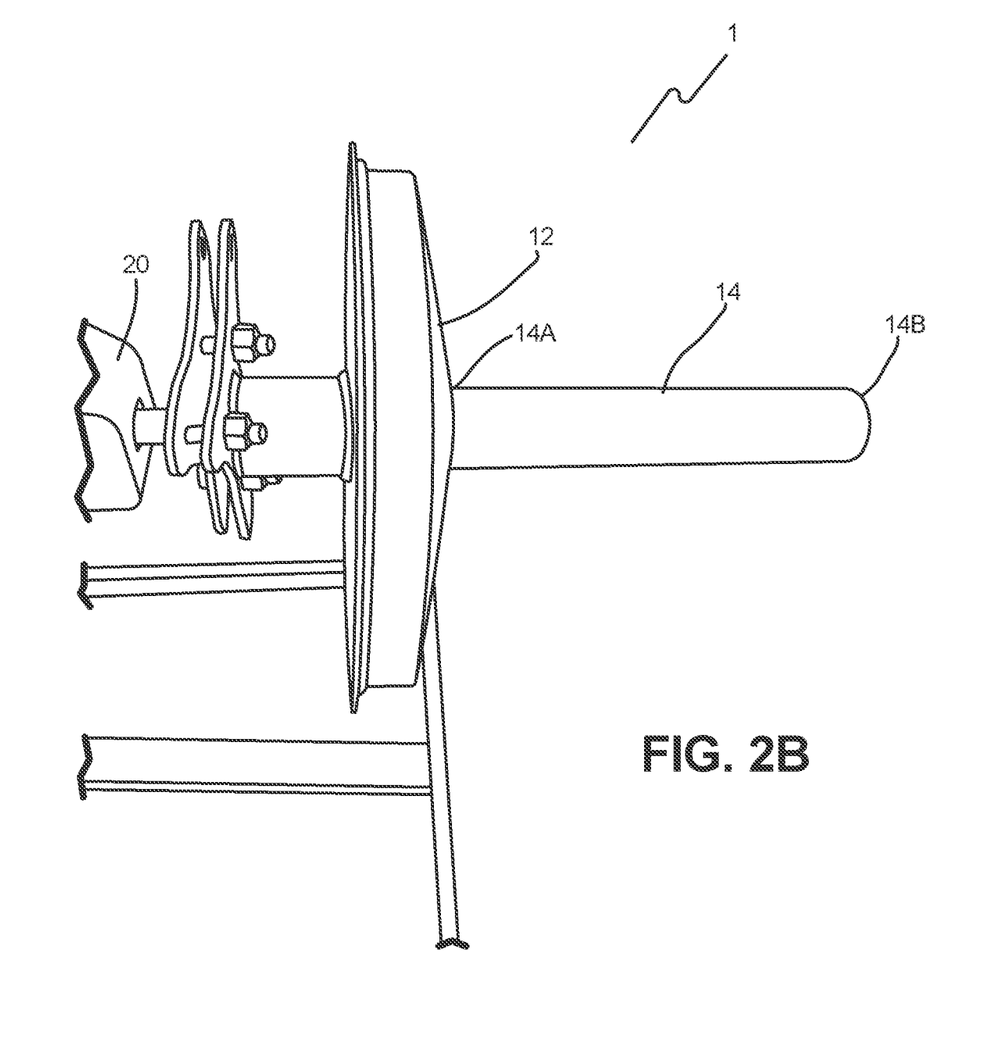
FIG. 2B is another side perspective view of the tire mount, according to the embodiment of FIG. 2A.

Accordingly, in various implementations, and as shown in FIG. 2A and FIG. 2B, the outer plate (not shown) is slidably connected to the central axle 14 and is capable of being moved relative to the inner plate 12 or removed completely. In use in various implementations, and as would be understood by one of skill in the art, the outer plate 10 can be positioned at various points on the central axle 14 between the first end 14A, which is adjacent to the inner plate 12, to the second end 14B.

Figure 3A:
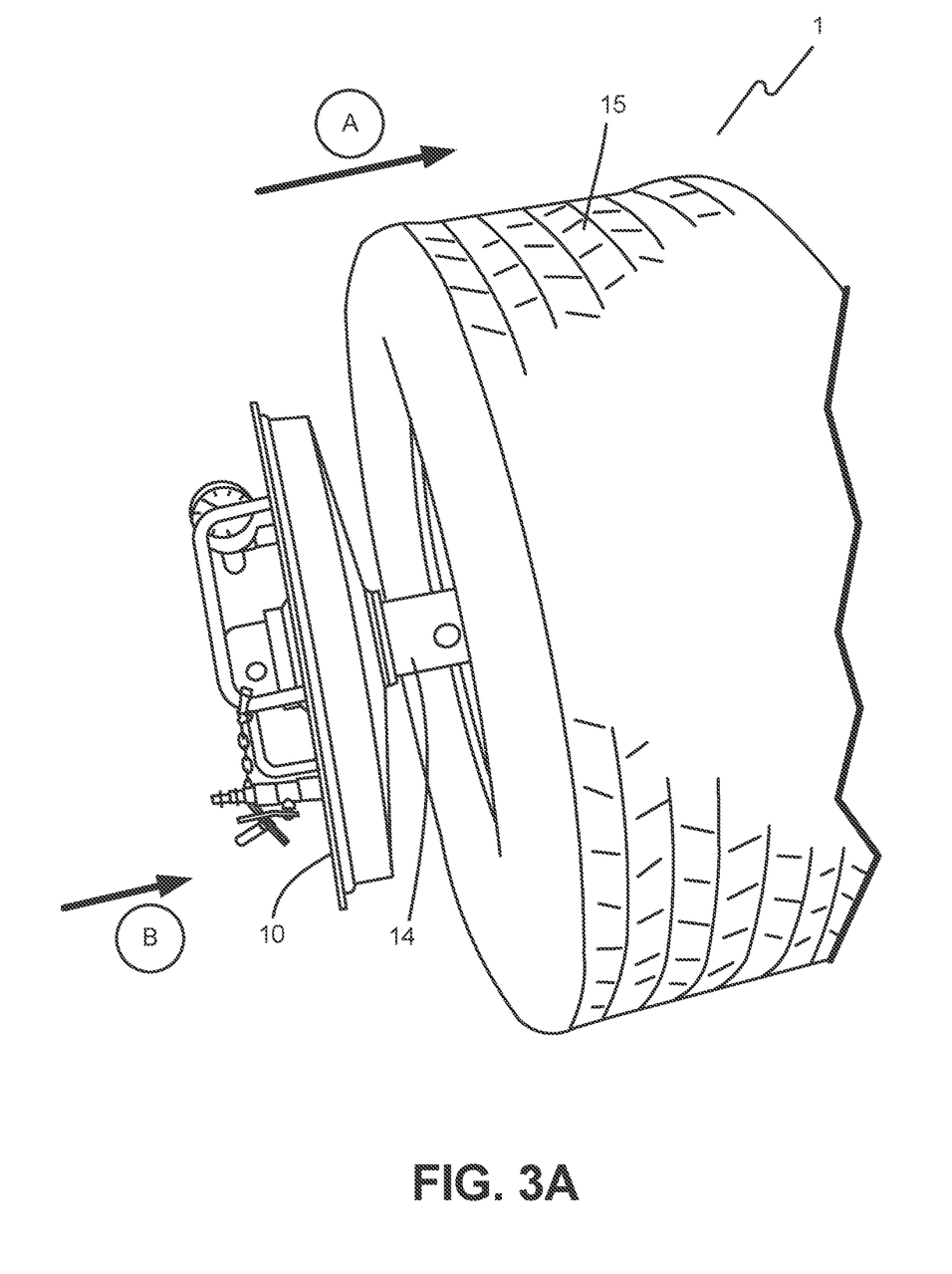
FIG. 3A is a side perspective view of the tire mount with the outer plate removed, such that a tire can be mounted, according to one implementation.
Figure 3B:
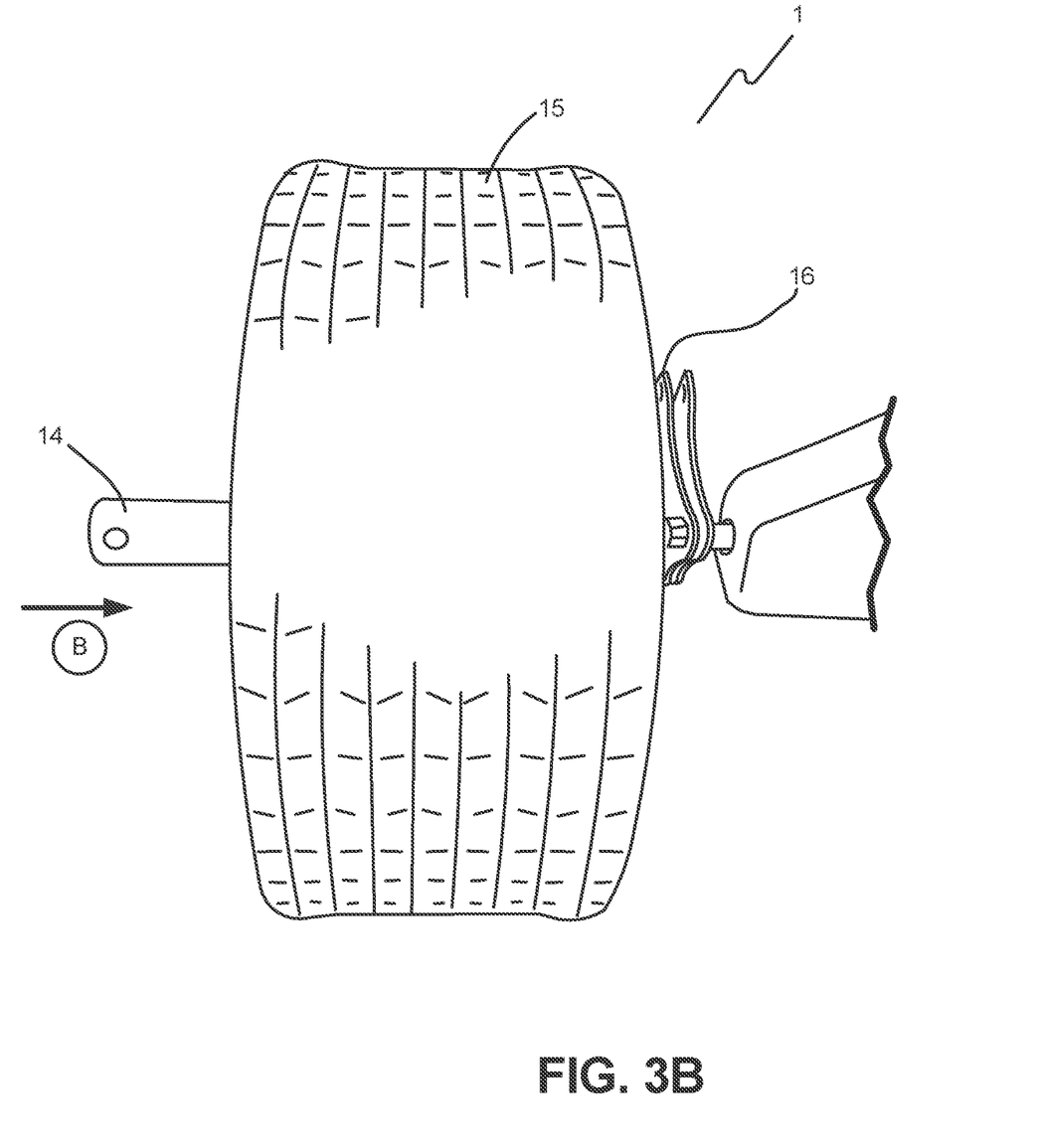
FIG. 3B is another side perspective view of the tire mount, according to the embodiment of FIG. 2A, showing a mounted tire.
Figure 3C:
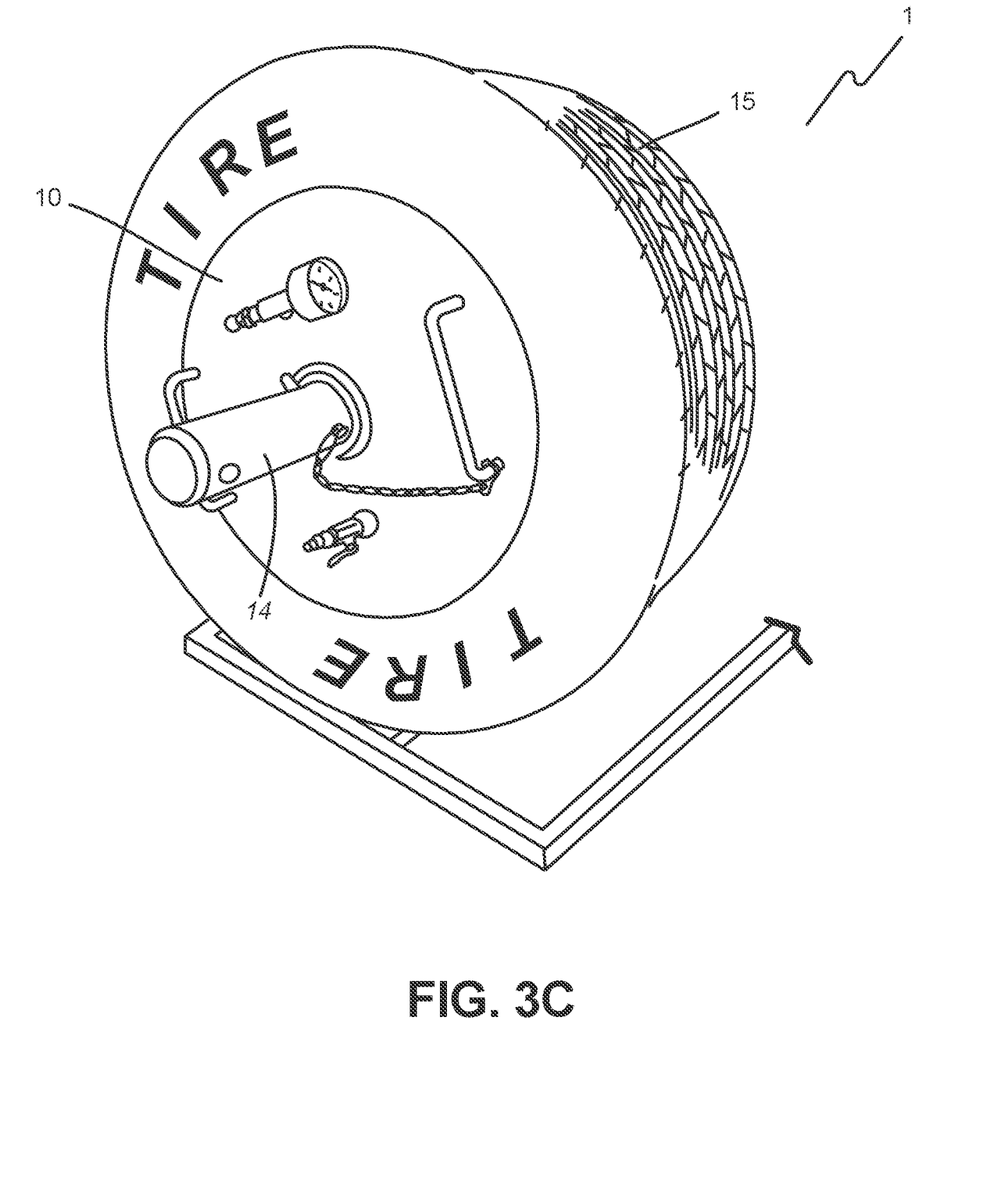
FIG. 3C is another side prospective view of the tire mount showing a mounted tire, according to on implementation.

In use, and as shown in the implementations of FIGS. 3A-C, a user can place the tire 15 onto the axle 14 and slide it into place toward the inner plate 12 (as shown by reference arrow A) on the axle 14, so as to couple with the inner plate 12. Subsequently, once the tire 15 is in place against the inner plate 12, the outer plate 10 can be mounted on the axle and slid into place toward the tire 15 (shown by reference arrow B). In various implementations, the axle 14 can be rotated by way of the prep stand 20 to facilitate the creation of a seal at the inner and outer plate beads, though this is not necessary for a user to create a seal on the tire 15—urging the outer plate 10 into position can be sufficient to seal the tire to both plates 10, 12. The pin (not shown) can subsequently be inserted into the desired opening 30, 32 to prevent the outer plate from sliding off the axle 14.

Figure 4A:
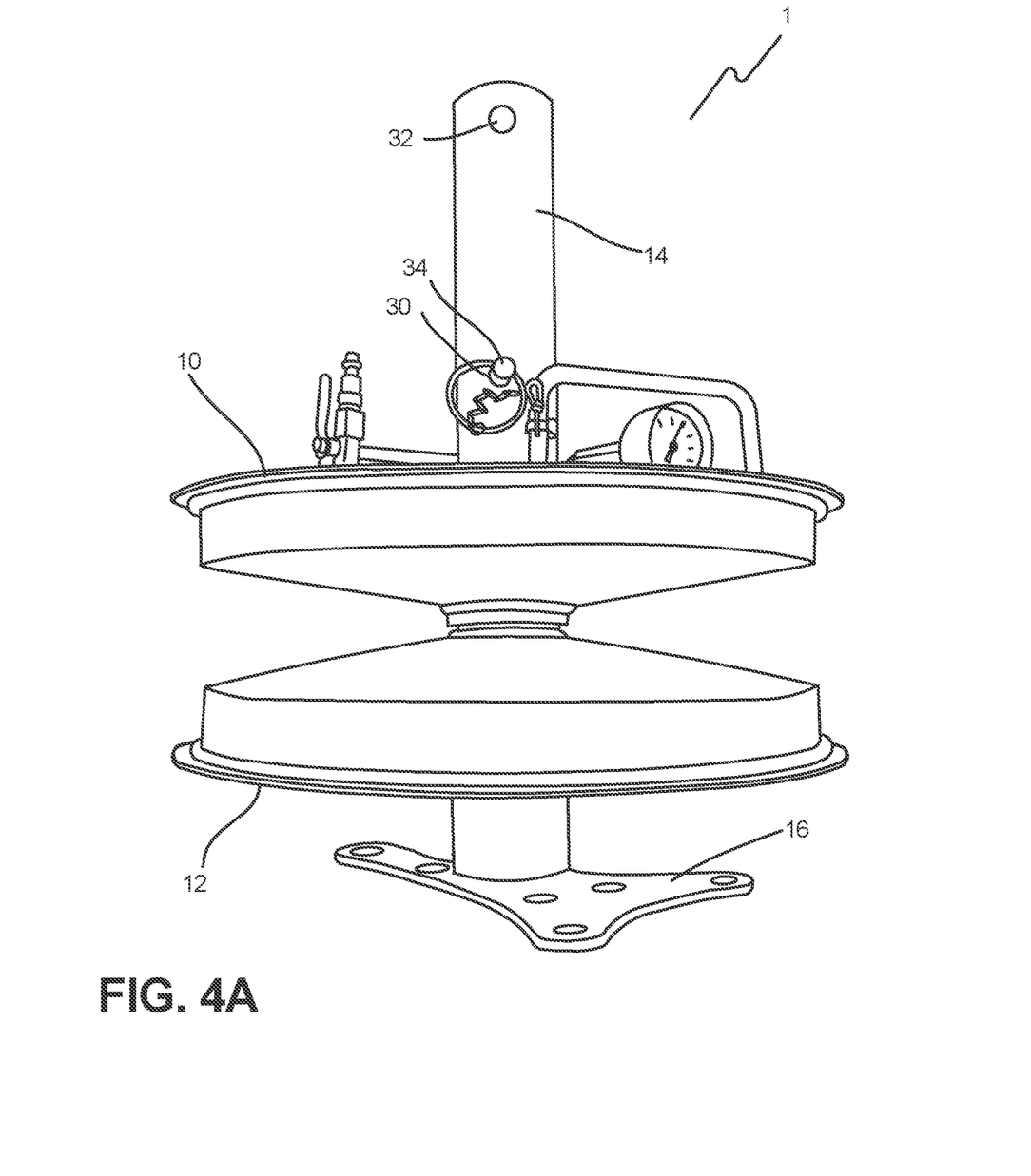
FIG. 4A is a side view of the wheel mount removed from the prep stand, according to one implementation.
Figure 4B:
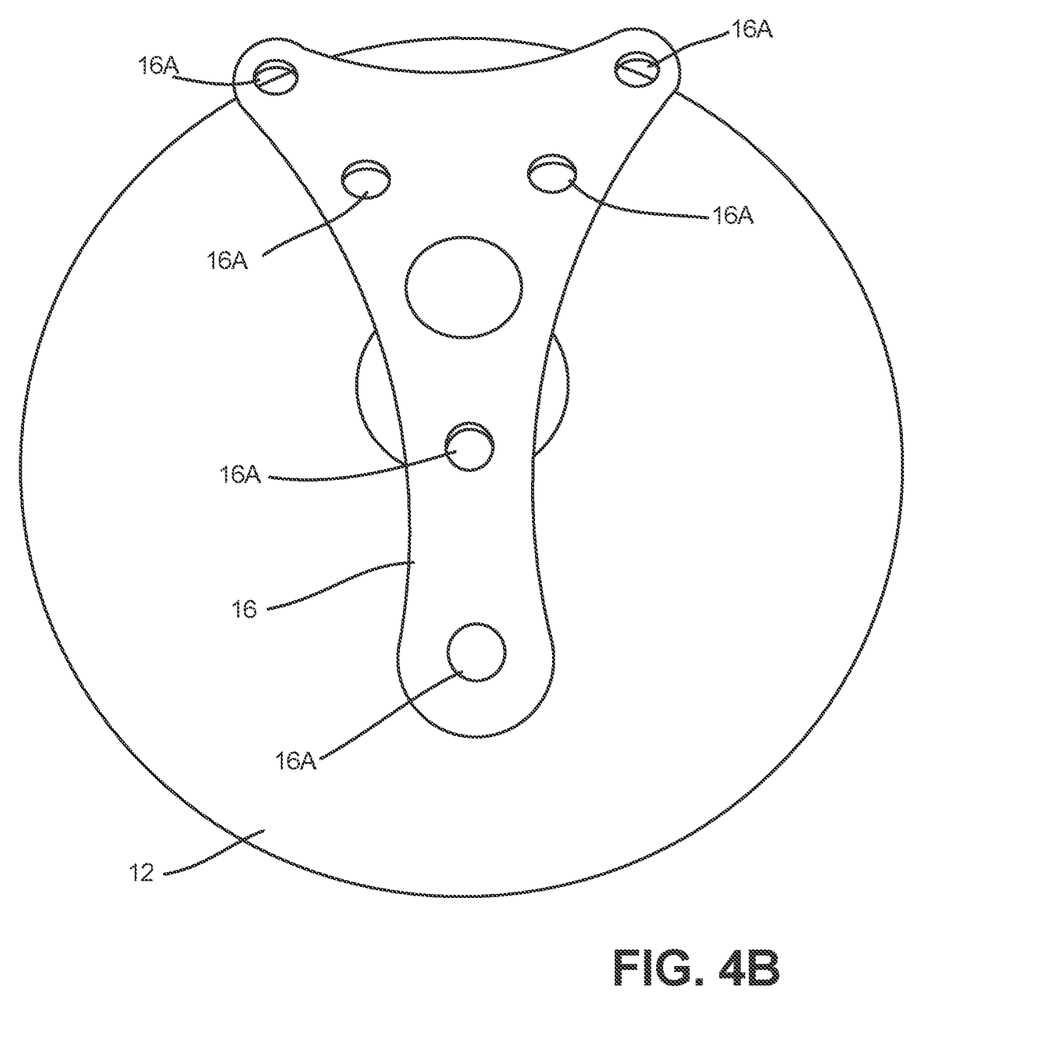
FIG. 4B is a rear view of the inner plate, according to one implementation.
Figure 4C:
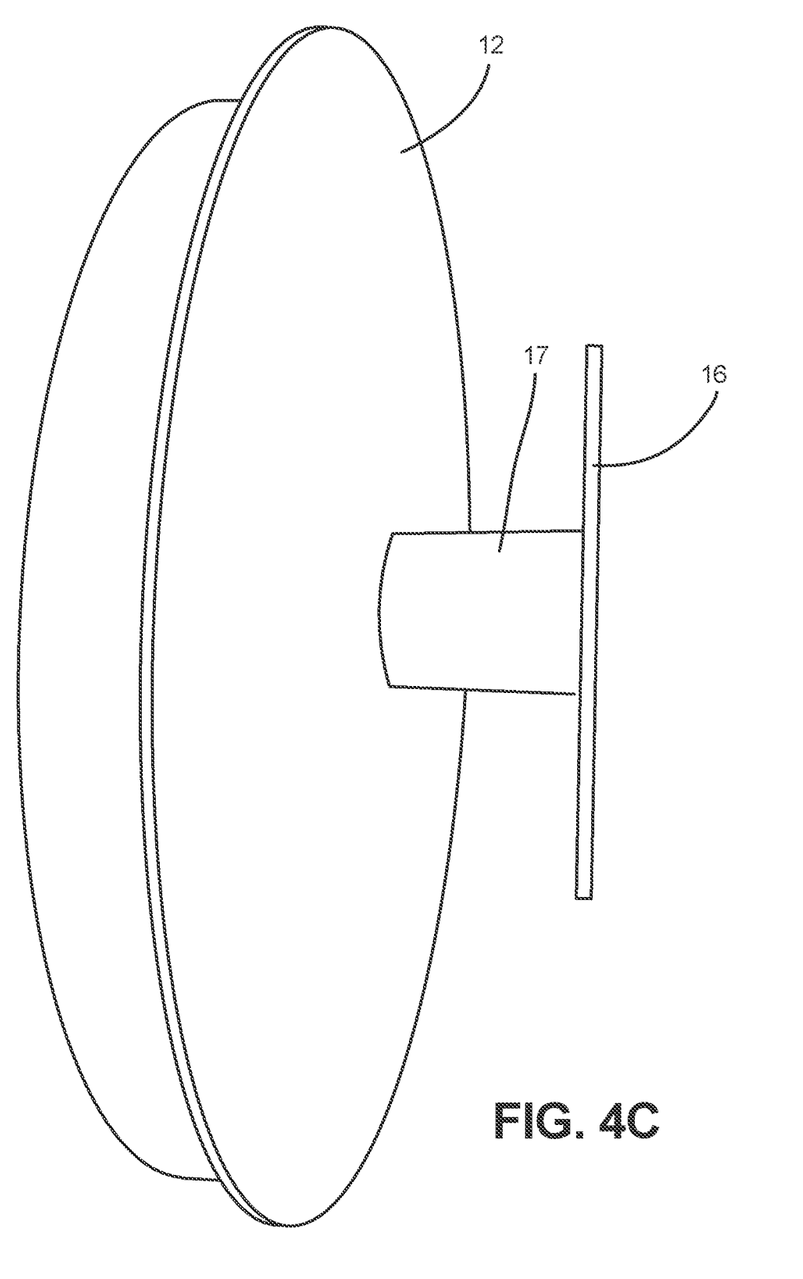
FIG. 4C is a side view of the inner plate, according to one implementation.

As shown in the implementation of FIG. 4A, the tire mount 1 can also be removed from the prep stand (not shown). As best shown in the implementation of FIG. 4B, in various implementations, a variety of mounting holes 16A can be provided on the mounting plate 16 to facilitate mounting to the prep stand (as shown in FIGS. 1A-C), as would be understood by one of skill in the art. As shown in the implementations of FIGS. 4B-4C, the mounting plate 16 is fixedly attached to the outer side of the inner plate 12 with a mounting spacer 17 or other fixed connection. In these implementations, the mounting plate 16 is attached to the spacer 17 (such as be welding or any other known mechanism or process for attachment) and disposed outside the outer side of the inner plate 12.

Figure 5A:
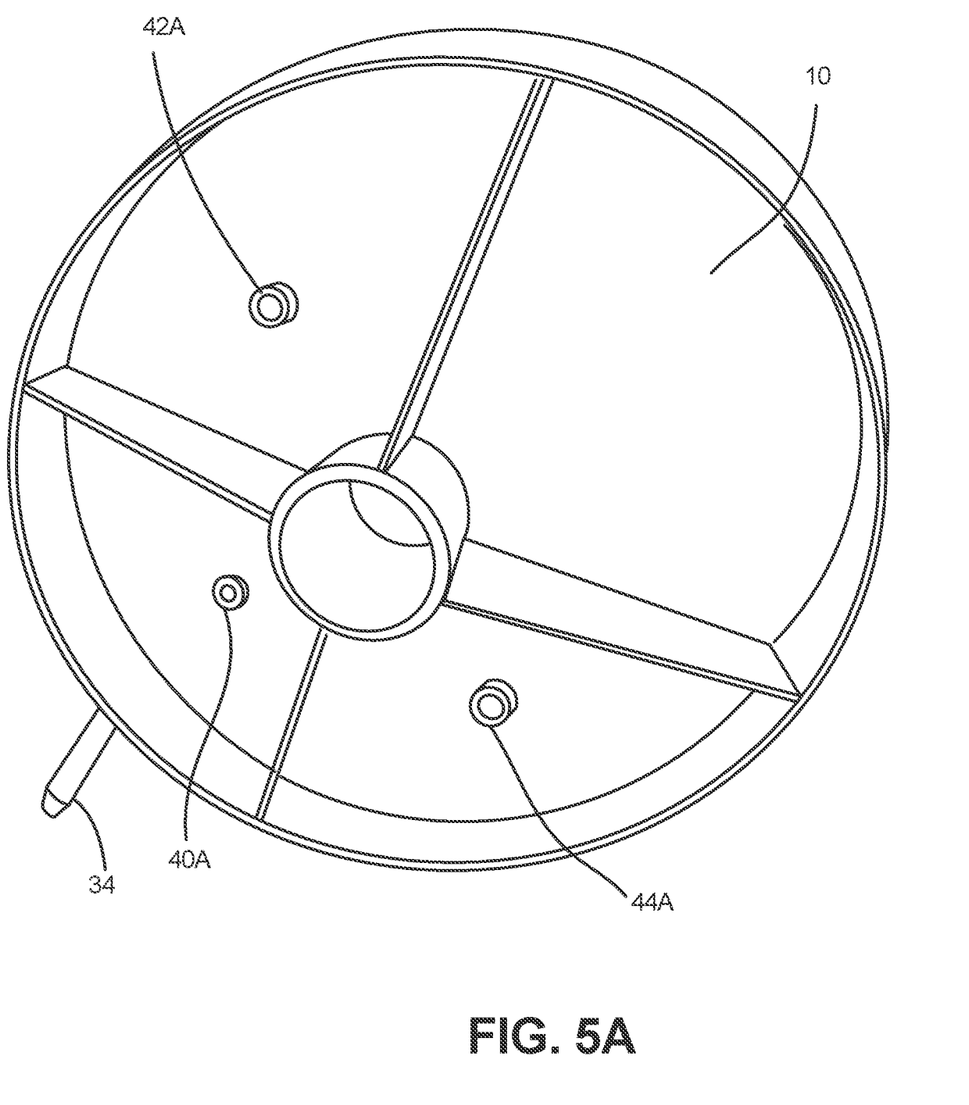
FIG. 5A is a perspective interior view of the outer plate, according to one implementation.
Figure 5B:
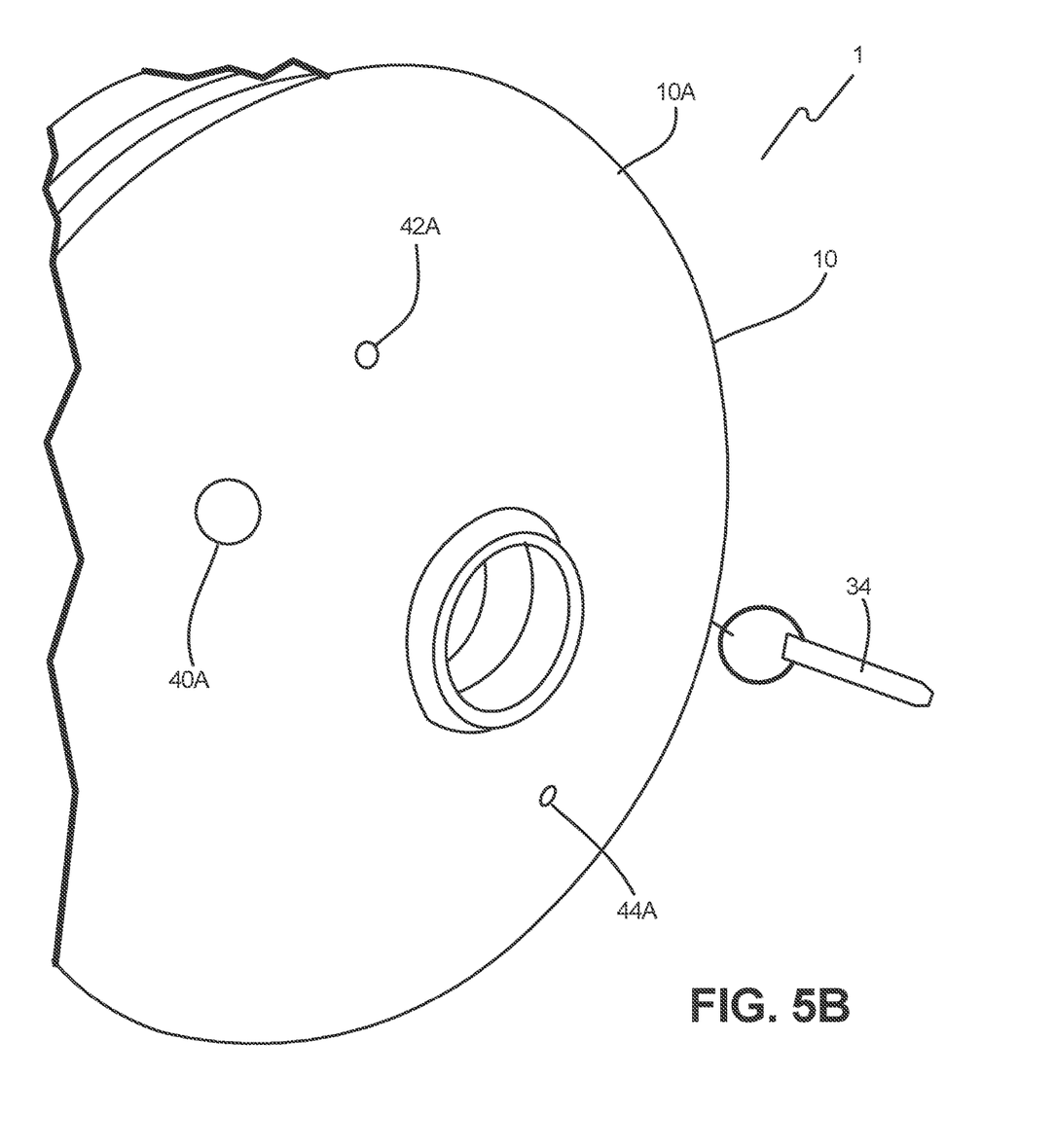
FIG. 5B is a perspective view of the implementation of FIG. 5A with the inner face attached.

FIGS. 5A and 5B depict implementations of the inner side of the outer plate 10 without the inner face 10A. The implementation of FIG. 5A depicts the inner connections for the filling port 40A, pop-off safety valve 42A and tire pressure gauge 44A. These are in selective hermetic communication with the interior of a mounted tire when the tire is properly placed on the inner 12 and outer 10 plates, so as to allow the selective, sealed introduction of air into the tire after it has been mounted. In FIG. 5B, the inner face 10A has been attached to the plate 10.

Although the disclosure has been described with reference to preferred embodiments, persons skilled in the art will recognize that changes may be made in form and detail without departing from the spirit and scope of the disclosed apparatus, systems and methods.

What is claimed is:

1. A rimless tire mount, comprising:
   a) a central axle;
   b) a pair of axle O-rings;
   c) an inner plate comprising;
      i) an inner bead
      ii) an inner bead O-ring and
      iii) a central opening configured to hold one of the pair of axle O-rings, the inner plate attached to the central axle via the center opening and said one O-ring forming an hermetic seal;
   d) a mounting plate comprising;
      i) a first side constructed and arranged to be attached to a prep stand and
      ii) a second side opposite the first side, the second side spaced apart from and attached to the inner plate;
   e) an outer plate comprising:
      i) an outer bead;
      ii) an outer bead O-ring;
      iii) a central opening configured to hold the other one of the pair of axle O-rings;
      wherein the outer plate is mountable on the central axle via the center opening and said the other O-ring forming an hermetic seal such that the tire fitted between the outer plate and the inner plate without a rim can be inflated.

2. The rimless tire mount of claim 1, further comprising a pop-off safety valve.

3. The rimless tire mount of claim 2, wherein the mounting plate further comprises a mounting pattern, the mounting pattern comprising at least one mounting hole for attachment to the prep stand.

4. The rimless tire mount of claim 3, wherein the central axle comprises at least one pin mounting hole.

5. The rimless tire mount of claim 4, further comprising a spacer disposed between the inner plate and the mounting plate.

6. The rimless tire mount of claim 5, wherein the outer plate further comprising a filling port.

7. The rimless tire mount of claim 6, wherein the outer plate further comprises a tire pressure gauge.

8. A rimless tire mounting system comprising:
   a) a central axle;
   b) a pair of axle O-rings;
   c) an inner plate comprising:
      i) an inner bead
      ii) an inner bead O-ring and
      iii) an inner plate central opening configured to hold one of the pair of axle O-rings, the central axle attached to the inner plate via the inner plate center opening and said one O-ring forming an hermetic seal;
   d) a mounting plate comprising:
      i) a first side configured to fit to a prep stand and
      ii) a second side attached to the inner plate;
   e) an outer plate comprising:
      i) an outer bead;
      ii) an outer bead O-ring; and
      iii) an outer plate central opening configured to hold the other one of the pair of axle O-rings;
      wherein the outer plate is in slidable communication with the central axle via the outer plate central opening and said the other O-ring forming an hermetic seal such that a tire can be secured and inflated between the outer plate and the inner plate.

9. The system of claim 8, wherein the central axle is configured to receive a pin.

10. The system of claim 9, further comprising a spacer disposed between the inner plate and the mounting plate.

11. The system of claim 10, wherein the mounting plate further comprises a plurality of mounting holes.

12. The system of claim 11, wherein the plurality of mounting holes create a mounting pattern, the mounting pattern arranged to accept a variety of prep stands.

13. The system of claim 12, further comprising a pop-off safety valve.

14. A tire mount comprising:
a) a central axle;
b) a pair of axle O-rings;
c) an outer plate, comprising:
 i) an outer plate face;
 ii) an outer plate bead;
 iii) an outer plate O-ring; and
 iv) an outer plate central opening configured to hold one of the pair of axle O-rings, the outer plate is in slidable communication with the central axle via the outer plate central opening and said one O-ring forming an hermetic seal;
d) an inner plate, comprising:
 i) an inner plate face;
 ii) an inner plate bead;
 iii) an inner plate O-ring; and
 iv) an inner plate central opening configured to hold the other of the pair of axle O-rings, the central axle attached to the inner plate via the inner plate center opening and said the other O-ring forming an hermetic seal;
e) a mounting plate attached to the central axle and removably secured to a prep stand;
wherein a tire is secured between the outer plate face and the inner plate face such that the tire can be inflated for testing and repair.

15. The tire mount of claim 14, wherein the inner plate is fixedly attached to the central axle.

16. The tire mount of claim 15, wherein the mounting plate has a mounting pattern, the mount pattern arranged to accept different prep stands.

17. The tire mount of claim 16, further comprising at least one pin configured to be placed through a hole in the central axle.

18. The tire mount of claim 17, further comprising a filling port.

19. The tire mount of claim 18, further comprising a pop-off safety valve and a tire pressure gauge.

* * * * *